March 17, 1959 E. W. HELLER 2,877,692
COMPENSATING TRACING STYLUS
Filed Aug. 1, 1956
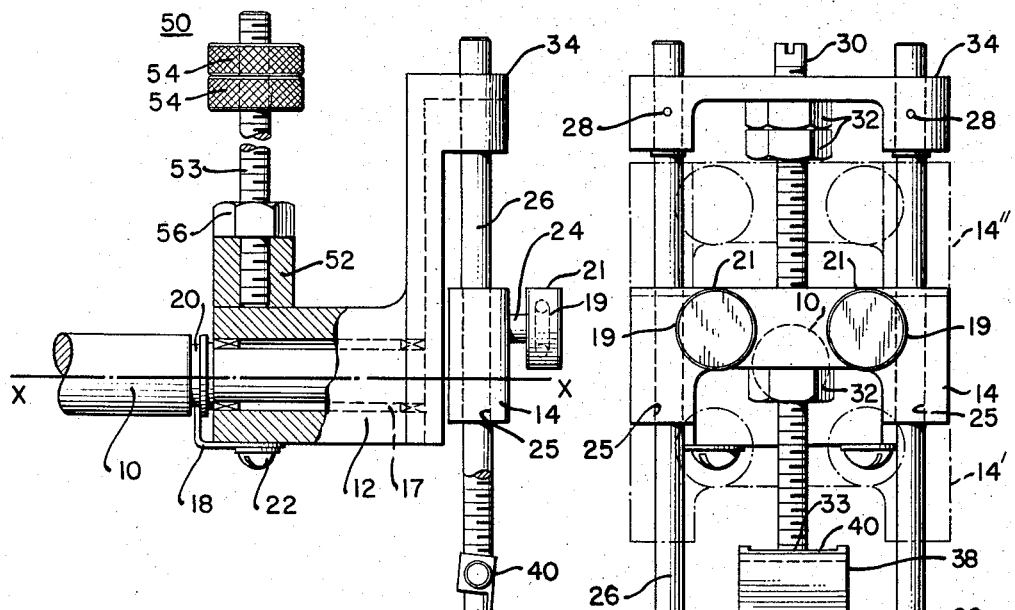
Fig. 2.
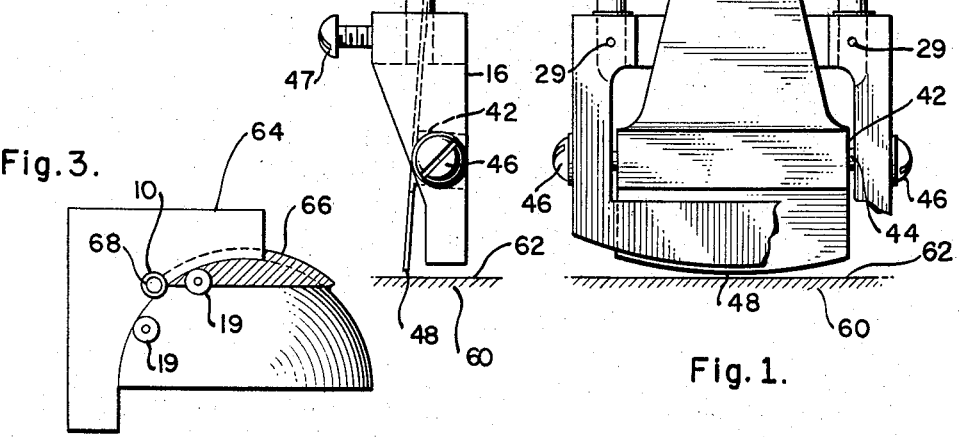
Fig. 3.
Fig. 1.
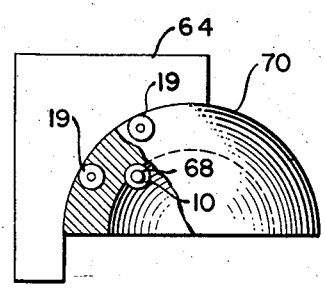
Fig. 4.
Inventor.
ELMER W. HELLER,
By
Attorney.

United States Patent Office 2,877,692
Patented Mar. 17, 1959

2,877,692

COMPENSATING TRACING STYLUS

Elmer W. Heller, Los Angeles, Calif., assignor to Hughes Aircraft Company, Culver City, Calif., a corporation of Delaware Application August 1, 1956, Serial No. 602,486

3 Claims. (Cl. 90—62)

The present invention relates generally to mechanical machine tool control elements and particularly to a tracer stylus for positioning a tracer arm of a tracer-controlled machine tool in accordance with a master or template.

Tracer-controlled machine tools wherein the form of a master or template is transferred to a workpiece by means of a tracer unit actuated by a tracer arm which follows the contour of the template to continuously change the relative position of the cutter and the workpiece in accordance with the shape of the template are well known in the art. In the past rollers or fingers have been used to follow the template and thereby position the tracer arm. These rollers or fingers must be of the same shape as the cutting tool to prevent errors from being introduced into the finished part. This requirement often presents serious problems. To perform a satisfactory job of tracing a template, the tracer roller or finger should have a relatively large radius, whereas in many applications the cutting tool must have a relatively small radius to perform a satisfactory job of cutting the workpiece.

The rollers or fingers that have been used to position tracer arms have the further disadvantage that only one curve can be traced accurately from a particular template. Hence, where it is desired to make several finished pieces having parallel but displaced surfaces, it is necessary to use several templates. In making a finished piece that has a uniform wall thickness, two templates have been required in the past. This requires not only two templates of equal degree of precision, but to avoid accumulation of errors between the two templates, far greater precision is required in the templates than is required of the part. The use of the ordinary tracer rollers or fingers in conjunction with a tracer arm also requires that concave parts be made from concave templates, and that convex parts be made from convex templates.

It is an object of the present invention to provide a tracer stylus which can be adapted for use with a cutting tool of any radius.

It is another object of the present invention to provide a tracer stylus that can follow a template curve and position a tracer arm of a tracer-controlled machine tool along a curve that is parallel and displaced a given distance from the template curve.

It is a further object of the present invention to provide a tracer stylus which can be adjusted to cause a tracer-controlled machine tool to make convex or concave cuts from a convex or concave template.

In accordance with the present invention, a tracer stylus is provided to position a tracer arm of a tracer-controlled machine tool in accordance with a curve that is parallel and displaced a predetermined distance from a template in which a base member is secured to the tracer arm to position a principal axis of the base member perpendicularly to the plane of the template. A carriage is movably mounted on the base member about an axis disposed substantially at right angles to the principal axis and a follower mechanism adapted to follow the curve is mounted on the carriage on an axis that is substantially perpendicular to the principal axis and the axis about which the carriage moves. The carriage is moved with respect to the base member to position the tracer arm a predetermined distance from the template, thereby causing the tracer arm to trace a curve parallel and displaced the predetermined distance from the template as the follower mechanism follows the template.

The novel features which are believed to be characteristic of the invention, both as to its organization and method of operation together with the further objects and advantages thereof, will be better understood from the following description considered in connection with the accompanying drawing in which:

Fig. 1 is a plan view of a tracer stylus embodying the principles of the present invention;

Fig. 2 is a side elevational view, partially in section, of the tracer stylus shown in Fig. 1;

Fig. 3 is a diagrammatic illustration of the use of the tracer stylus shown in Figs. 1 and 2 for following an internal or concave template to cause the machine tool to make an external cut from a workpiece;

Fig. 4 is a diagrammatic illustration of the use of the tracer stylus provided in accordance with the present invention for following an internal template to make an internal cut parallel to and displaced a predetermined distance from the template curve.

Referring to Figs. 1 and 2, a tracer arm of a tracer-controlled machine tool is indicated by numeral 10. A base member of a tracer stylus having a front bracket 12, a pair of spaced guide rods 26 and a rear bracket 16 is secured to the tracer arm by means of a spring clip 18 which seats in an annular groove 20. The front bracket 12 is provided with a bore 17 that has a bearing surface thereon to permit the tracer stylus to rotate freely about the tracer arm 10. The spaced guide rods 26 are secured to the upper end 34 of the front bracket 12 by means of suitable securing pins 28. The rear bracket 16 is likewise secured to the guide rods by means of securing pins 29. A carriage 14 is mounted for movement on the guide rods by means of cylindrical bore holes 25 which cooperate with the guide rods. The carriage moves along an axis that is perpendicularly disposed to a principal axis XX of the base member which coincides with the centerline of the tracer arm 10. A follower mechanism consisting of a pair of spaced roller bearings 19 is mounted on this carriage by means of suitable journals or shafts 24 which are pressed into the carriage or otherwise secured thereto. The roller bearings are mounted symmetrically with respect to the principal axis of the base member and have a common diametral axis that is perpendicularly disposed with respect to the principal axis XX and to the axis which the carriage moves along. The roller bearings are urged toward the template by the tracer arm during the tracing operation and engage the curve at contact points 21. This positions the rear bracket away from the template and the front bracket beside the template. As the roller bearings 19 roll along the contour surface of the template their common diametral axis is maintained substantially parallel to a tangent drawn to the template midway between the points of contact of the rollers with the template.

The roller bearings and the carriage thus perform the function of positioning the principal axis of the base member or the centerline of the tracer arm at a desired point on a line that is the perpendicular bisector of the two points of contact of the bearings with the template. Many other types of follower mechanisms and carriage arrangements could be used for this purpose. It is only necessary that the follower mechanism be adapted to sense the template at two points spaced equidistant from the principal axis and that the carriage be adapted to change the distances between each sensing point and the principal axis while maintaining the distances from the principal axis to each sensing point equal. A mechanical arrangement that senses the template at two points by a pair of bearings is probably the most obvious curve follower mechanism.

The distance between the points of contact of the bearings 19 with the template is not critical but must be sufficiently large to prevent the stylus from tipping and thereby removing one of the bearings from contact with the template during the tracing operation. Because of its two points of contact with the template the follower mechanism may introduce some error into the tracing operation. Where the radius of the template is small compared to the distance between the points of contact of the bearings with the template an error will be introduced by the tracing mechanism. Hence, it may be desirable to mount the journals or shafts of the bearings 19 so that the distance between the bearing shafts can be changed to reduce the error introduced by the two points of contact with the template curve to a negligible magnitude. The diameter of the bearings is also not critical but should be sufficiently large to permit the bearings to roll smoothly over the desired template curve.

To permit the tracer arm to follow a curve that is parallel and displaced a given distance from the template, it is only necessary to move the carriage 14 to a position along the guide rods 26 such that the distance from the principal axis XX to the template curve is equal to this given distance. An adjusting screw 30 is provided to permit the distance between the principal axis and the template curve to be changed. Lock nuts 32 cooperate with this adjusting screw to prevent the carriage from moving towards the front bracket 34 once the carriage has been adjusted to a desired position. A safety device including a safety plate 38 prevents the carriage and adjusting screw from moving towards the rear bracket under normal operating conditions. By means of this safety plate which abuts the end 33 of the adjusting screw with a suitable cylindrical bearing 40 and the lock nuts 32, the carriage can be locked into a particular position. The safety device is necessary when the stylus is tracing an internal or concave template to cause the machine tool to make an external or concave cut, or when an external template is being traced and the machine is making an internal cut. Under these conditions, when the cutter is retracted from the cut for tool change, inspection, or some dangerous condition being present, the tracer stylus without the safety device would be forced against the template beyond its normal operating deflection. To permit the tracer arm to move towards the template and thereby allow the cutting tool to be withdrawn from the work, a safety release mechanism in the form of the safety plate 38 and a suitable over-deflection guard 60 is provided. The over-deflection guard 60 is rigidly fixed in relation to the cutting tool and tracer unit. The over-deflection guard is adjusted to leave a small clearance between its leading edge 62 and the rear edge 48 of the safety plate 38. This clearance alows the tracer arm and the stylus to deflect as is necessary for the sensing function, but when the stylus is over-deflected the surface 48 comes into contact with the edge 62 causing the plate 38 to rotate in a clockwise direction. When the cylindrical bearing 40 disengages the end 33 of the adjusting screw the carriage 14 slides back towards the rear bracket 16 and the tracer arm no longer senses the template but is pushed by the over-deflection guard to a position beyond the template, thereby permitting the machine tool to withdraw the cutting tool from the work. The safety plate 38 includes a support member 42 which is journalled in a suitable bearing member 44. The bearing member 44 is secured to the rear bracket 16 by means of journal screws 46. The safety plate is prevented from rotating in a counter-clockwise direction beyond the end 33 of the adjusting screw by means of a screw 47.

Since the sensing function of the tracer arm in a tracer-controlled machine tool depends upon the forces transmitted to it by the template curve, it is necessary to balance the tracer stylus so that it is not influenced by variable gravitational effects. Such balancing may be accomplished by a counterbalancing member 50 consisting of a threaded shaft 53, two threaded balancing weights 54 and a locking nut 56. The threaded shaft 53 is screwed into a threaded portion 52 of the front bracket 12 and the balancing weights 54 are threaded along the shaft 53 until the stylus is balanced on the tracer arm. Gravitational forces are thereby prevented from acting on the tracer arm and causing erroneous deflections.

In operation a suitable template is secured to a tracer-controlled machine tool in a well-known manner. The tracer stylus is secured to the tracer arm of the machine tool with the clip 18 and screw 22. This positions the principal axis of the tracer stylus perpendicularly to the plane of the template. The tracer arm is adjusted to cause the roller bearings 19 to touch the template curve at the desired points. The carriage 14 is then positioned along the guide rods 26 so that the center line of the tracer arm will trace the desired curve. The lock nuts 32 are tightened to prevent the carriage from moving with respect to the base member during the tracing and cutting operation, and then the balancing weights 54 are adjusted to balance the stylus on the tracer arm. If the safety device is necessary for the particular cutting operation, the stop member 60 must also be adjusted on the tracer unit to leave a small clearance between its leading edge 62 and the edge 48 of the safety plate 38.

A diagrammatic illustration of the use of a tracer stylus for tracing an external or convex template, to cause a machine tool such as a lathe to make an external cut from a workpiece rotating on its own axis of symmetry, is shown in Fig. 3. The carriage of Fig. 1 is moved to the position indicated by 14' for this tracing operation. The tracer stylus positions the tracer arm 10 by means of the roller bearings 19 following a template 64 to cause a suitable cutting tool 68 to make a finished cut of the same radius of curvature as the template on workpiece 66. As this view illustrates, the tracer stylus can be used to follow an internal template to make an external cut and to also compensate for the radius of a cutting tool.

In Fig. 4 the carriage of Fig. 1 is moved to the position indicated by 14" to adjust the stylus to trace the template 64 and control the machine tool in making an internal cut from workpiece 70. The finished article resulting from the combined cutting operations illustrated in Figs. 3 and 4 will be of constant wall thickness and have parallel external and internal surfaces.

In accordance with this invention, there is provided a tracer stylus for following a template and positioning the tracer arm of a tracer-controlled machine tool along a curve that is parallel to, and displaced a predetermined distance from, the template in which a follower mechanism, adapted to sense the template at two points and thereby follow the template is mounted on the tracer arm, to position the points at which the follower mechanism senses the template at equal distances from the tracer arm. The follower mechanism is adapted to be moved on the tracer arm to position the tracer arm a predetermined distance from the template while maintaining the distances between each point at which the follower mechanism senses the template and the tracer arm equal.

What is claimed is:

1. In a tracer unit for use with a template the combination comprising, a base member mounted on said arm and having a principal axis perpendicularly disposed relative to the plane of the template, a carriage movably mounted on said base member about a second axis, said second axis being disposed at right angles to said principal axis, a follower means mounted on said carriage and adapted to follow the template to cause said tracer arm to follow a curved surface that is substantially parallel and displaced from said template a predetermined distance, and a safety release mechanism mounted on said base member and adapted to disengage said follower mechanism from said template when said follower mechanism is overdeflected.

2. A stylus comprising: a front bracket member adapted to be secured to a tracer arm to position a principal axis of said front bracket member perpendicular to the plane of a template, a pair of spaced parallel guide members, each having one end thereof secured to said front bracket member, each of said guide members having a longitudinal axis extending anteriorly and posteriorly with respect to said principal axis in a plane perpendicular to said principal axis, a rear bracket member secured to the other end of each of said guide members, a carriage slidably mounted on said guide members and a pair of spaced sensing members mounted on said carriage and adapted to engage said template to maintain said longitudinal axis of said guide members substantially at right angles to a line extending through the points of contact of said sensing members with the template.

3. A stylus for use with a tracer controlled machine tool comprising: a front bracket member having an internal cylindrical cavity therein adapted to engage a tracer arm, a pair of spaced parallel guide rods, each having one end thereof secured to said front bracket member to position said one end anteriorly of the longitudinal axis of said cavity, said rods extending posteriorly of the longitudinal axis of said cavity in a plane perpendicular to the longitudinal axis of said cavity, a rear bracket member secured to the other end of each of said guide rods, a carriage having two bores therein receiving said guide rods, each of said rods passing through one of said bores, an adjusting member adjustably secured to said carriage and having an anterior end and a posterior end, said anterior end engaging said front bracket member to maintain said carriage at a predetermined minimum distance from said one end of each of said guide rods, a pair of sensing rollers mounted on said carriage to position the axis of rotation of said rollers perpendicular to the plane defined by the longitudinal axes of said guide rods and at substantially equal distances from the longitudinal axis of said cylindrical cavity, said rollers having a common diametrical axis perpendicular to said longitudinal axis and to the plane of said guide rods, a safety plate rotatably mounted on said rear bracket member and adapted to engage the posterior end of said adjusting member to prevent relative movement between said carriage and said rear bracket member, and means for rotating said plate, thereby disengaging said plate from said adjusting member, whereby said carriage and rollers may be moved towards said rear bracket member.

References Cited in the file of this patent

UNITED STATES PATENTS

| | | |
|---|---|---|
| 2,395,525 | Wilkie et al. | Feb. 26, 1946 |
| 2,557,876 | Klema | June 19, 1951 |
| 2,717,446 | Gomes | Sept. 13, 1955 |
| 2,718,819 | Stephan | Sept. 27, 1955 |
| 2,800,838 | Johnson | July 30, 1957 |